United States Patent Office 3,761,283
Patented Sept. 25, 1973

3,761,283
METHOD OF TENDERIZING MEAT
Charles F. Snyder, Dallas, Tex., assignor to Bonanza International, Inc., Dallas, Tex.
No Drawing. Filed July 16, 1971, Ser. No. 163,428
Int. Cl. A22c 18/00
U.S. Cl. 99—107
3 Claims

ABSTRACT OF THE DISCLOSURE

A method for the rapid tenderization of meat employing an accelerated aging process. The method comprises subjecting the meat, immediately after the animal is slaughtered, to an aging process at a temperature within the range of from about 100° to 120° F. under conditions of high relative humidity and under ultra-violet light for a period sufficient to achieve the desired degree of tenderness, thereafter chilling the meat to a temperature of about 36° to 40° F., and then subjecting the meat to a pasteurizing level of electron-beam generator radiation.

---

This invention relates to a method for tenderizing meat and, more particularly, to an accelerated meat tenderizing aging process employing a post-aging pasteurizing radiation treatment.

It has long been the practice in the meat packing industry to age animal carcasses immediately after slaughter under controlled conditions whereby the meat becomes tenderized due to the action of natural enzymes present in the meat. For many years, the aging process was carried out at temperatures around 35° F., and at this temperature, it generally took two to four weeks for the meat to achieve the desired degree of tenderness. A process was then developed for reducing the aging time to three to five days by carrying out the aging at temperatures closer to room temperature; i.e., around 55° to 68° F. At these higher temperatures, in order to prevent dehydration and resulting shrinkage in the meat, it was found necessary to conduct the process under conditions of high relative humidity. Further, since the environment of high temperature and high moisture content tends to promote growth of spores, mold and bacteria, it has been the general practice to carry out the process under ultra-violet light which has germicidal or bactericidal properties and controls surface microbial growth.

More recently, it has been determined that the optimum temperatures for the tenderizing action of the enzymes in the meat are within the range of from 100° to 120° F. At these higher temperatures, the desired degree of tenderness can be achieved in aging periods of from about 6 to 24 hours, depending upon the temperature employed and the grade of meat. However, the use of such high temperatures presents additional problems in controlling microbial growth which are not overcome by the use of ultra-violet light alone. Gamma irradiation in combination with an antibiotic infusion prior to aging has been found to be effective, at least on a laboratory scale, in controlling microbial growth during aging at these higher temperatures. However, at its most effective levels, gamma irradiation produces adverse effects on the ultimate tenderness of the meat and detectable flavor changes in the aged meat, and also can render the meat radioactive. This, together with the inherent dangers of employing gamma irradiation in a commercial meat packing establishment, in that it would require having a potentially hazardous radioactive element in the manufacturing premises which cannot be turned off, has up to this time prevented any commercial application being made of the accelerated aging process at the optimum temperatures for enzymic tenderizing action.

It is therefore an object of the present invention to provide a meat tenderizing process wherein enzymic tenderizing action is greatly accelerated.

Another object of the invention is to provide an accelerated meat tenderizing process permitting aging of the meat at optimum temperatures for enzymic tenderizing action as well as effective control of microbial growth at such temperatures.

A further object of the invention is to provide an accelerated meat tenderizing process wherein microbial growth at optimum aging temperatures is effectively controlled without any significant adverse effect on the ultimate tenderness, flavor, color, and nutritive value of the meat and without danger of rendering the meat radioactive.

Still another object of the invention is to provide an accelerated meat tenderizing process wherein effective control of microbial growth at optimum aging temperatures is achieved by means which does not involve the use of potentially hazardous radioactive materials and which can be safely and effectively operated in a commercial meat packing establishment.

The foregoing objects of the invention, and other objects which will become apparent as the description proceeds, are achieved by providing a method for tenderizing meat wherein freshly slaughtered animal carcasses or cuts thereof are aged at a temperature within the range of from about 100° to about 120° F. in a treating zone maintained at a relative humidity of from about 85% to about 95% under ultra-violet light radiation for a period sufficient to achieve the desired degree of tenderness, which generally ranges from about 6 to 24 hours, depending upon the temperature employed and the grade of meat. Thereafter, the carcasses or cuts are quickly reduced in temperature to about 36° to 40° F. and then fabricated into steaks, which are then subjected to electron-beam generator radiation of sufficient dosage to pasteurize the meat; i.e., to reduce micro-organisms to the pre-aging, natural level. Generally, radiation dosages within the range of from about 45,000 to 100,000 rads are employed.

In the preferred practice of the invention, the freshly slaughtered carcass, after being skinned and cut up into primal cuts, is placed in a hanging room having a temperature initially of about 120° F. so as to raise the internal meat temperature to 110° F. The time required to attain 110° F. can be reduced by placing the meat in the hanging room as shortly after slaughter as possible, retaining as much body heat as possible. The temperature of the hanging room is controlled by thermocouple probes inserted in the meat and is regulated to maintain the internal meat temperature at 110° F. and thereby take advantage of the natural tenderizing action of the enzymes contained in the meat which achieve peak performance at this temperature.

The relative humidity of the aging room is maintained at 85% to 95% in order to avoid appreciable loss of moisture from or shrinkage of the meat. A continuous flow of sterile air at the rate of about 50 to 75 feet per minute is maintained through the room. In order to minimize surface micro-organism and micro-flora growth during the aging process, the room is furnished with ultra-violet light in the bactericidal range, that is, between about 2500 and 3000 angstrom units.

Once the internal temperature of the meat reaches the desired aging temperature, the aging process is carried out for a period of time sufficient to achieve the desired degree of tenderness in the meat. This period of time will vary, depending upon the aging temperature employed and the grade of meat being aged. For example, at the preferred aging temperature of 110° F., prime or choice grade beef will be sufficiently tenderized in approximately 8 hours, whereas utility grade beef will require an aging period of approximately 16 hours. If the aging temperature is increased, the aging period will be correspondingly shortened. Hence, the aging period may vary from about 6 hours at 120° F. for prime or choice grade beef, to about 24 hours at 100° F. for utility grade beef. Aging temperatures above 120° F. are generally to be avoided, since they result in the meat having a cooked taste and appearance.

After the desired degree of tenderness is achieved, the meat is removed to a room or tunnel equipped with high-speed heat transfer equipment whereby the internal temperature of the meat is quickly reduced to about 36° to 40° F., which generally takes from 2 to 4 hours. The meat is then trimmed, boned, and fabricated into steaks. The steaks are then moved by conveyor belt, in single layers, into and through a shielded tunnel housing an electron-beam generator linear accelerator, such as the "Linatron 1500" linear accelerator manufactured by Varian Associates of Palo Alto, Calif., where the steaks are subjected to electron-beam generator radiation of sufficient dosage to pasteurize the meat. For example, with the conveyor belt moving at a rate of speed so as to expose the steaks to the radiation for about 3 seconds, a dosage of 85,000 rads has been found effective for achieving pasteurization. After coming out of the tunnel, the steaks are then frozen and packaged for shipment in the customary manner.

The term "electron-beam generator radiation," as used herein, is intended to designate the radiation emanating from a linear accelerator system such as that designed for use in radiographic inspection of thick sections of various materials. This type of equipment, which operates from an electrical power supply, generates an electron-beam and directs it against a target, causing the target to give off a radiation beam similar in nature to X-rays. Since the equipment is electrically operated, electron-beam generator radiation can be readily turned on and off by the operator and hence is controllable to a much greater extent than radiation such as gamma radiation which emanates from radioactive substances.

Linear accelerator systems which can be suitably employed in the process of the present invention for producing electron-beam generator radiation, are well known in the art and their construction forms no part of the present invention. A typical linear accelerator system which can be utilized in the process of this invention is the "Linatron 1500" linear accelerator system, manufactured by Varian Associates of Palo Alto, Calif. This generator radiation-producing unit having an electron-beam energy rating of 7.5 to 8 mev. and a radiation beam intensity rating at full power energy of 1500 rads per minute at one meter distance.

It has been found in accordance with the present invention that electron-beam generator radiation is highly effective for pasteurizing meat which has been subjected to an accelerated aging process at temperatures of 100° to 120° F. At pasteurizing levels, which generally range from 45,000 to 100,000 rads, electron-beam generator radiation reduces micro-organisms to the pre-aging, natural level without rendering the meat radioactive and without any significant adverse effect on the ultimate tenderness, flavor, color, or nutritive value of the meat. However, the depth of penetration into the meat of electron-beam generator radiation is limited to about 1¼ inches and, hence, in order to insure that the meat is thoroughly pasteurized, the meat when subjected to the radiation treatment should be no greater than 1¼ inches in thickness. For this reason, fabrication of the meat into steaks prior to the radiation treatment has been found to be the most efficient manner of carrying out the process of the present invention.

The herein disclosed process may suitably be used to effect tenderization of various types of meat including beef, veal, pork, lamb, mutton, poultry, and fish.

The invention will be further understood by reference to the following example which is given by way of illustration and without any intention that the invention be limited thereto.

EXAMPLE

A freshly killed steer is skinned, and the carcass cut up into primal cuts. The cuts are placed in a hanging room having a relative humidity of 85% to 95%, a continuous flow of sterile air at the rate of about 50 to 75 feet per minute, and furnished with ultra-violet light in the range of between about 2500 and 3000 angstrom units. The temperature of the hanging room is maintained at 120° F. until the internal temperature of the meat approaches 110° F., and then is reduced to 110° F. The meat is then aged at 110° F. for 12 hours. Following aging, the meat is removed to a chill room equipped with high-speed heat transfer equipment and cooled to a temperature of 36° F. over a period of 4 hours. The meat is then trimmed, boned, and fabricated into steaks ¾ inch thick. The steaks are then placed on a conveyor belt, in single layers, and moved through a shielded tunnel housing a "Linatron 1500" linear accelerator so as to expose each steak for a period of 3 seconds to 85,000 rads of electron-beam generator radiation, and thereby reduce micro-organisms to the pre-aging, natural level without any significant adverse effect on the ultimate tenderness, flavor, color, or nutritive value of the meat.

Although a preferred embodiment of the invention has been disclosed, it will be understood that modifications may be made within the spirit and scope of the appended claims.

I claim:

1. An accelerated process for tenderizing animal carcasses and cuts thereof, which comprises subjecting freshly slaughtered carcass to an aging temperature within the range of from about 100° to 120° F. in a treating zone maintained at a relative humidity of from about 85% to about 95% under ultra-violet light at a concentration of between 2500 and 3000 angstroms, maintaining a continuous flow of sterile air past said carcass at a rate of about 50 to 75 feet per minute, maintaining said carcass at said aging temperature for an aging period of from about 6 to about 24 hours, thereafter quickly reducing the temperature of said carcass to a temperature of from about 36° to about 40° F., then fabricating said carcass into steaks no greater than about 1¼ inches in thickness, and then subjecting said steaks to electron-beam generator pasteurizing radiation of about 45,000 to about 100,000 rads.

2. The process of claim 1 wherein said aging temperature is 110° F. for an aging period of about 12 hours.

3. The process set forth in claim 1, wherein each steak is exposed to radiation of about 85,000 rads for about 3 seconds.

References Cited
UNITED STATES PATENTS

| | | | |
|---|---|---|---|
| 2,169,081 | 8/1939 | James | 99—107 |
| 2,519,931 | 8/1950 | Roschen et al. | 99—107 |
| 3,057,735 | 10/1962 | Ottke et al. | 99—107 X |

OTHER REFERENCES

American Meat Institute Foundation, "The Science of Meat and Meat Products," 1960, published by W. H. Freeman and Co., San Francisco, p. 266.

HYMAN LORD, Primary Examiner